United States Patent [19]

Yagi et al.

[11] 4,329,662
[45] May 11, 1982

[54] SILENT DISCHARGE GAS LASER

[75] Inventors: Shigenori Yagi; Shuji Ogawa; Norikazu Tabata, all of Amagasaki, Japan

[73] Assignee: Mitsubishi Denki Kabushiki Kaisha, Tokyo, Japan

[21] Appl. No.: 132,157

[22] Filed: Mar. 20, 1980

[30] Foreign Application Priority Data

Mar. 20, 1979 [JP] Japan .................................. 54/32568

[51] Int. Cl.$^3$ .............................................. H01S 3/97
[52] U.S. Cl. ........................................ 372/38; 372/85
[58] Field of Search ................................ 331/94.5 PE

[56] References Cited

U.S. PATENT DOCUMENTS 3,745,481 7/1973 Erickson et al. .............. 331/94.5 G

OTHER PUBLICATIONS

Yagi et al., "Silent Discharge CO$_2$ Laser", *Study on Laser*, vol. 5, No. 3, pp. 171–176 (1977).
Brown et al. "Closed—Cycle Performance of a High—Power—Electric—Discharge Laser", Appl. Phys. Lett. vol. 21, No. 10, Nov. 15, 1972, pp. 480–481.

*Primary Examiner*—James W. Davie
*Attorney, Agent, or Firm*—Oblon, Fisher, Spivak, McClelland & Maier

[57] ABSTRACT

A silent discharge gas laser comprises an earthing electrode and a high voltage electrode whose discharge surface is covered with a dielectric and a power source for applying an AC high frequency high voltage to excit a laser gas. The power source periodically and intermittently applies high frequency voltage to turn on and off to give high peak value.

6 Claims, 10 Drawing Figures

SILENT DISCHARGE GAS LASER

BACKGROUND OF THE INVENTION

1. Field of the Invention

The present invention relates to an improvement of a silent discharge gas laser having high output power.

2. Description of the Prior Arts

Referring to FIG. 1, a transversal excitation $CO_2$ laser, the conventional continuous oscillation type silent discharge gas laser is illustrated.

In FIG. 1, the reference numeral (1) designates a grounded electrode; (2) designates high voltage metal electrode which is arranged to the grounded electrode (1) to form a pair of discharge electrodes. The discharge surface of the high voltage metal electrode is covered by a dielectric layer. The reference numeral (4) designates a discharge gap; (5) designates a transformer; (6) designates a high frequency power source; (7) designates a total reflector; (8) designates a partial reflector; (9) designates a coolant water recycling pump; (10) designates a cooler; and (11) designates an ion-exchange type water deionizer.

The operation of the silent discharge gas laser will be illustrated.

When high frequency high voltage power is applied to the high voltage metal electrode (2) by the high frequency power source (6) and the transformer (5), a stable discharge as a silent discharge is formed across the discharge gap (4). The silent discharge is an AC discharge formed through the dielectric layer (3) between the high voltage metal electrode (2) and the grounded electrode (1), whereby a stable unbalanced discharge having high electron temperature can be formed without increasing the molecule temperature and without causing any arcing. The description of light induced radiation step caused by molecules excited in the discharge gas (4) is not discussed in detail. A laser oscillation occurs in the resonator comprising the total reflector (7) and the partial reflector (8) due to the silent discharge in the discharge gap (4) whereby the laser radiation l is emitted from reflector (8) at the output side.

In this case, the high voltage metal electrode (2) is cooled by coolant water having a low electric conductivity. The coolant water is recycled through the passage between the high voltage electrode and the pump including (9) cooler, (10) water deionizer and (11) high voltage electrode. In the water recycling, a deionization of the coolant water (decreasing electric conductivity) is attained so as to prevent the electric leakage from the high voltage metal electrode (2) in the ion-exchange type water deionizer (11).

The gas (not shown) in the discharge gap (4) is passed between the grounded electrode (1) and the high voltage metal electrode (2) perpendicular to the laser radiation and the discharge direction, but parallel to the surfaces of the electrodes.

Referring to FIGS. 1(II)a and 1(II)b, the silent discharge will be illustrated.

As described above, the silent discharge is an AC discharge which occurs through the dielectric layer (3). The voltage $V_{gap}$ in the discharge gap (4) is increased depending upon the voltage of the power source. When the potential difference in the discharge gap reaches the discharge starting voltage $V_{dis}$, a pulse discharge which exists for a short time is formed in dispersion in the discharge gap. When the discharge starts, the charge caused by the discharge current is accumulated on the surface of the dielectric layer (3). As a result, the potential difference in the discharge gap (4) is decreased to stop the pulse discharge. When the voltage of the power source is increased again to cause the voltage in the discharge gap (4) to reach the discharge starting voltage, the discharge occurs again. The discharge is repeated for several to several tens times in a half cycle of the AC power source. In FIGS. 1(II)a and 1(II)b, the reference I designates the average value of the current. In the next half cycle, the discharge in reverse polarity is repeated in the similar manner. The power W is given by the equation:

$W = V \times I$ as FIG. 1(II)b.

FIGS. 2(a), 2(b), 2(c) show variations in the voltage of the silent discharge, power and the output of the laser in the case of the silent discharge gas laser which operates at a frequency $f = 5$ KH$_z$.

The laser medium gas comprises $CO_2$, $N_2$ and He at ratios of partial pressures of 5:60:35 under a total pressure of 70 Torr. The electrode gap is 20 mm; and the electrode length is 1 m. On the surface of the high voltage metal electrode (2), the dielectric layer (3) made of a borosilicate glass is covered by sintering.

FIG. 2(a) shows a waveform of the applied voltage V (peak value of 10 KV).

FIG. 2(b) shows a waveform of the making power (W); and

FIG. 2(c) shows a waveform of the output of the laser.

The discharge power is intermittently charged as shown in FIG. 2(b), whereas the output of the laser is substantially constant in time as shown in FIG. 2(c). However a ripple component having a frequency of 2 f and an intensity of about 10% is superposed because the power is intermittently charged as shown in FIG. 2(b).

When a substrate having a large heat conductivity is worked by the output of the laser (as metal works), certain heat energy externally escapes through the substrate. Thus, when an average output is equal, the output of the laser having higher peak value is advantageous over the output of the laser being substantially constant in time as shown in FIG. 2(c).

From the above-mentioned viewpoints, the oscillation output (P) can be studied under various conditions to find that the time constant in the increasing or decreasing of the ripple is dependent upon the composition and the pressure of the gas. The intensity of the ripple is varied depending upon the composition and the pressure of the gas. The above-mentioned time constant is equal to the time constant $\tau$ in the generation or the extinction of the output of the laser in a sudden application or a sudden stop of the high frequency voltage. (the time for imparting an intensity of 1/e times). The results of the measurements are shown in Table 1.

The time constant is decreased depending upon the increase of the pressure of a gas and the decrease of the ratio of the partial pressure of $N_2$.

TABLE 1

| Kind of gas | Time constant $\tau$(m sec.) in variation of output of laser; Gas pressure (Torr) | | |
|---|---|---|---|
| $CO_2$—$N_2$—He | 70 | 150 | 200 |
| 5:60:35 | 0.3 ± 0.1 | 0.15 ± 0.05 | 0.1 ± 0.03 |

TABLE 1-continued

| Kind of gas | Time constant τ(m sec.) in variation of output of laser; Gas pressure (Torr) | | |
|---|---|---|---|
| | 70 | 150 | 200 |
| $CO_2$—$N_2$—He 5:20:75 | 0.1 ± 0.03 | 0.05 ± 0.02 | 0.03 ± 0.01 |

SUMMARY OF THE INVENTION

The present invention is considered from the viewpoint of the practical requirements and the characteristics of variation of the oscillation output of the silent discharge laser in time.

The present invention relates to a gas laser which is useful as a heat source for processing such as a metal processing, by controlling a discharge power charge by turning on and off, a high frequency voltage application in a period of $T_1$ and $T_2$ which is several to several tens times of the period T of the high frequency voltage as the applied voltage of the silent discharge gas laser.

BRIEF DESCRIPTION OF THE DRAWINGS

FIGS. 1(II)a, 1(II)b respectively show time variations of the voltage and the power in the silent discharge:

DETAILED DESCRIPTION OF THE PREFERRED EMBODIMENTS:

Referring to FIGS. 3, 4(a), 4(b) and 4(c), an embodiment of the silent discharge gas laser will be illustrated.

Figure 3:
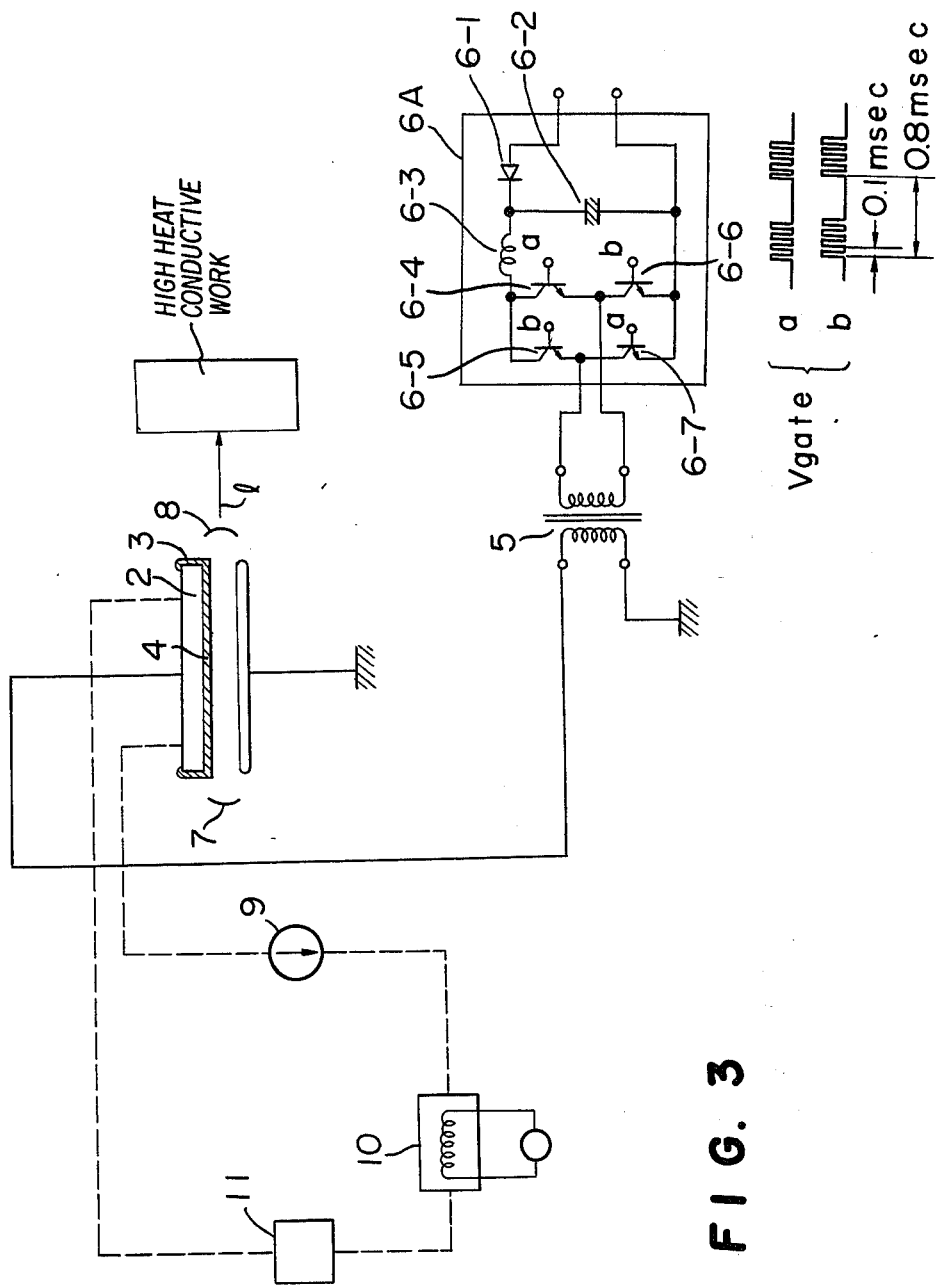
FIG. 3 is a schematic view of one embodiment of the silent discharge gas laser according to the present invention.

FIG. 3 is a diagram of one embodiment of the present invention. A high frequency high voltage is applied through a transformer (5) to a high voltage metal electrode (2) which is cooled by a coolant water recycling pump (9) similar to those of the prior art.

Thus, the present invention applies a high frequency voltage by means of a high frequency power source which can periodically turn the high frequency voltage on and off.

The high frequency power source 6A comprises a rectifying diode (6-1), a smoothing capacitor (6-2), a current smoothing reactance (6-3) and a switching transistor group (6-4) to (6-7). The gate voltage $V_{gate}$ of the transistor group has the waveforms a, b whose phase is shifted for 180 degree as shown in FIG. 3.

Figure 4A:
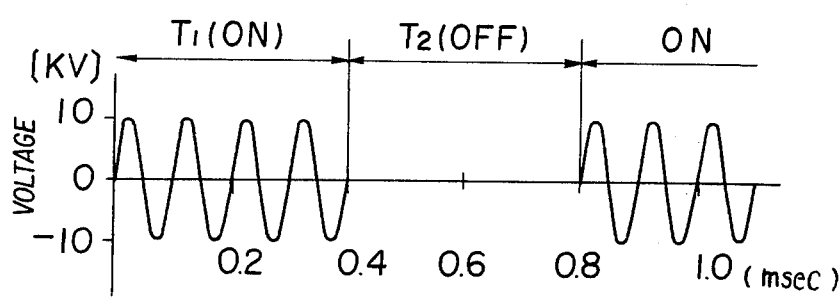
FIGS. 4(a), 4(b), 4(c) show waveforms for illustrating the operations.

The waveform of the output voltage of the high frequency power source (6A) is similar to the waveform shown in FIG. 4(a) (waveform applied through the transformer (5) to the electrode) to give ½ duty (the voltage) applying period $T_1$ and the voltage non-applying period $T_2$ are respectively 0.4 m sec.). This is repeated in the period of 8 times of one period of the high frequency voltage 10 $KH_z$.

The operation will be illustrated.

When the voltage having the peak value of 10 KV, a basical frequency (frequency of high frequency voltage) of 10 $KH_z$, duty of ½ (The voltage applying period $T_1$ and the voltage non-applying period $T_2$ are respectively 0.4 m sec.) is applied, a silent discharge results in the discharge gap (4) whereby a laser oscillation is formed by the operation of the resonator and a laser radiation 1 is emitted from the reflector (8) in the output side.

Figure 4B:
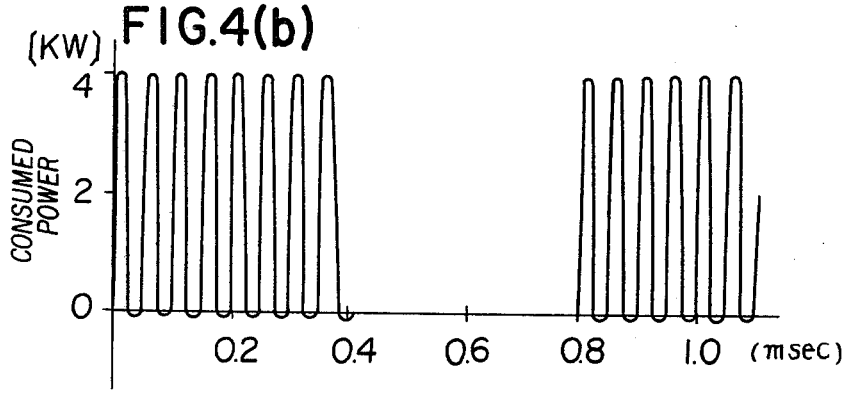

The silent discharge consumed power W (the waveform is shown in FIG. 4(b)) is proportional to the frequency. The laser output P is proportional to the discharge power W and accordingly, the laser output having the waveform shown in FIG. 4(c) and an average output of 100(W), a peak value of 200(W) and a duty of ½ is obtained. That is, the laser output having the same average discharge power and the same average laser output as those of the conventional one (FIG. 1) and having two times of the peak value, is obtained.

Figure 4C:
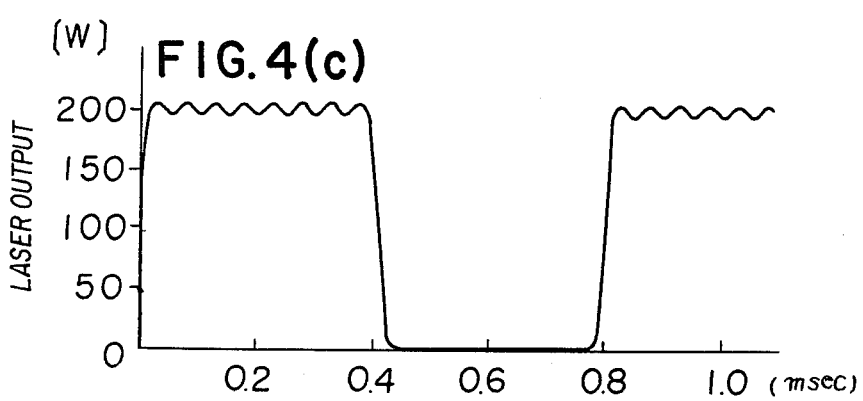

The conditions for varying the laser output P to the waveform shown in FIG. 4(c) are T/2 of a ripple period of P; $T_1$ of a voltage applying period(ON period); $T_2$ of a voltage non-applying period (OFF period) and τ of a time constant for rising and falling of the laser output. Therefore, the following relations are considered.

$$2 \times (T/2) < \tau < (T_1/4, T_2/4)$$

$$\therefore T < (T_1/4, T_2/4)$$

The time constant τ can be varied depending upon the kind of the gas and the pressure as shown in Table 1.

That is, the periodical intermittent laser output can be carried out by selecting the laser medium and the pressure under the condition of $T_1 > 4T$ and $T_2 > 4T$ wherein $T_1$ designates the voltage applying period(ON period) and $T_2$ designates the voltage non-applying period(OFF period) and T designates the period of the high frequency voltage.

It has been proposed to obtain a laser output having high peak voltage by turning on and off the discharge power charging in a DC glow discharge excitation laser. This is, however, quite different. The DC glow discharge should maintain the discharge stability by utilizing the space charge formed in the discharge gap in the normal state and the discharge stabilization resulted by an external ballast (resistance). The time variation of the discharge power causes unstable discharge. Therefore, it has been quite difficult to attain a discharge for providing an intermittent laser output.

Figure 1:
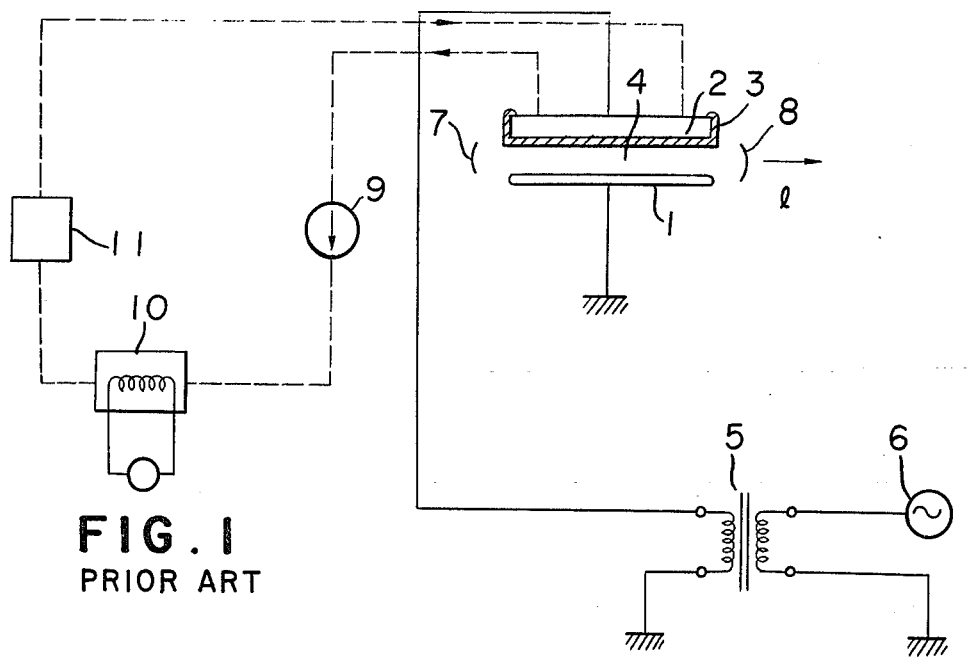
FIG. 1 is a schematic view of one embodiment of the conventional silent discharge gas laser.
Figure 1:
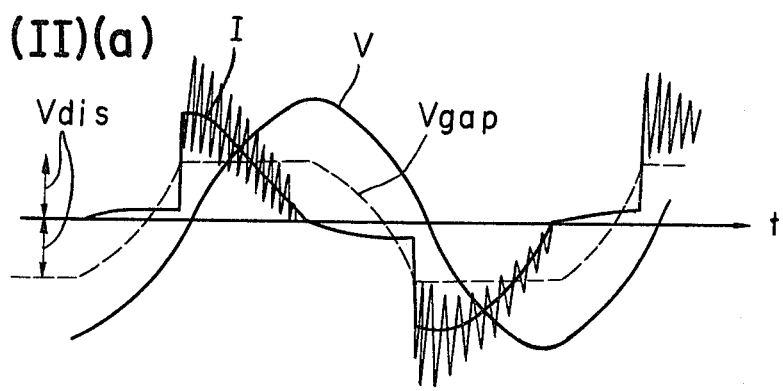
Figure 1:
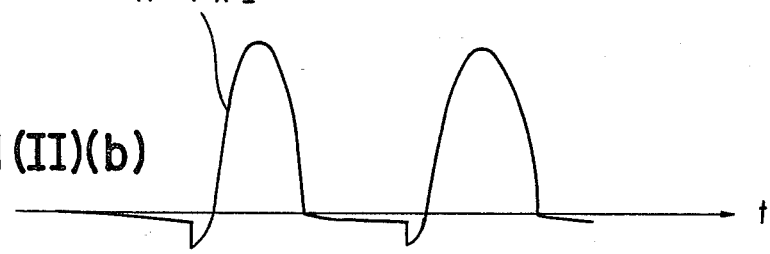
Figure 2A:
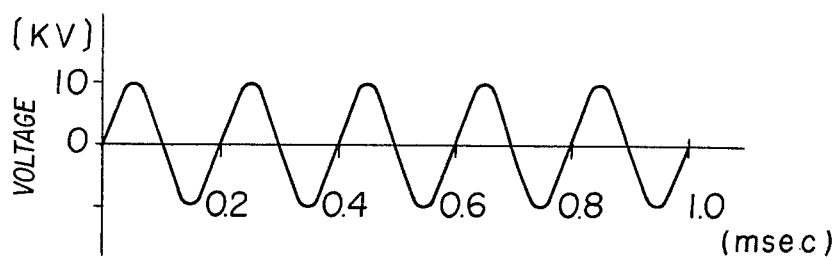
FIGS. 2(a), 2(b), 2(c) show waveforms for illustrating the operations.
Figure 2B:
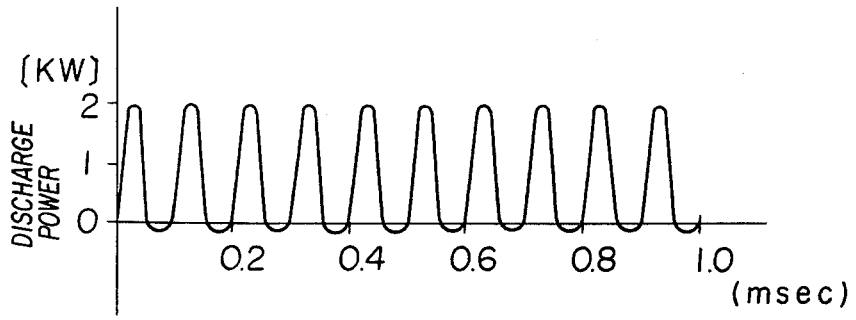
Figure 2C:
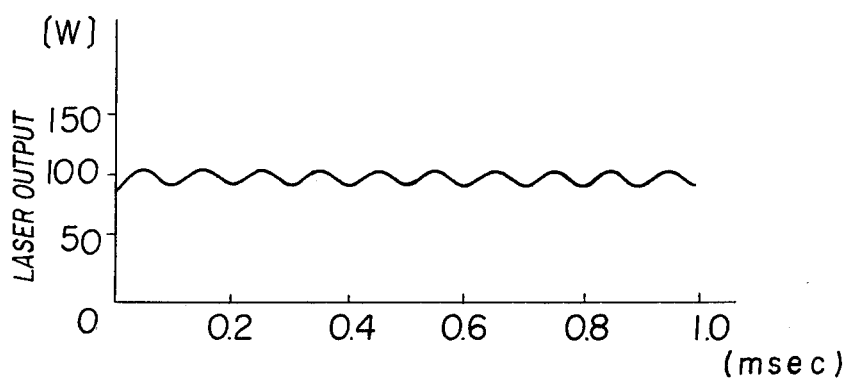

In the discharge of the silent discharge laser, however, the intermittent discharge for repeating pulse discharges for many times in a half cycle of the power voltage as shown in FIG. 1(II) can be stable.

Even though the fundamental frequency of the power is two times of the frequency in the conventional one and the applied voltage is turned on and off for each 0.4 m sec., the discharge is not unstable by the operation.

In accordance with the present invention, the high frequency power source in the conventional continuous oscillation type silent discharge gas laser is substituted by a high frequency power source whose applied voltage is intermittently and periodically turned on and off whereby the laser output having high peak value can be generated without changing the average value of the power charge and this is remarkably advantageous in metal processing.

In the above-mentioned embodiment, the voltage applied to the electrodes is periodically and completely turned on and off, however, the voltage applied in the OFF state need not be zero. For example, if a voltage lower than the discharge starting voltage($V_{dis}$ in FIG.

1(II)) is applied in the OFF period, the same effect can be expected since the ON period and the OFF period of the discharge are provided. If a ratio of the ON period $T_1$ to the OFF period $T_2$ is not 1:1, the same effect can be expected. This can be applied not only for the $CO_2$ gas laser, but also the other gas lasers such as CO, Ar, $N_2$, He-Ne gas lasers. The frequency of the voltage applied to the electrodes is not limited to 10 $KH_z$ and can be, for example, in a range of 10 $KH_z$ to 300 $KH_z$.

We claim:

1. In a silent discharge gas laser which comprises a high voltage electrode and a low voltage electrode, each electrode having a discharge surface, at least one of said discharge surfaces of said electrodes being covered with a dielectric layer and cooled, the improvement comprising:
   a power input for supplying high frequency, high voltage AC power having a period T;
   a first circuit means for receiving said power input and applying an output voltage between said electrodes to excite a laser gas, said first circuit means comprising switching means for alternating said output signal between a first voltage having a substantially zero peak value and a second voltage having a high peak value, wherein said first voltage does not start a discharge between said electrodes and has a period greater than 4 times T and said second voltage does start a discharge between said electrodes and has a period greater than 4 times T.

2. A silent discharge gas laser according to claim 1 wherein said switching means comprises a plurality of switching elements which are connected in bridge.

3. A silent discharge gas laser according to claim 2 wherein said switching elements are transistors which are controlled in ON period and OFF period by a gate voltage having phase shifted for 180 degrees.

4. A silent discharge gas laser according to claim 1 wherein a ratio of the period for said first voltage to the period for said second voltage is 1:1.

5. A silent discharge gas laser according to claim 4 wherein a peak value of said second voltage is about 10 KV and a frequency thereof is 10 $KH_z$–300 $KH_z$.

6. A silent discharge gas laser according to claim 1 wherein said first circuit means comprises a rectifying diode, connected in series with the parallel connection of a smoothing capacitor and a current smoothing reactance, and said switching means having one terminal connected to said capacitor and a second terminal connected to said reactance.

* * * * *